United States Patent [19]

Greatorex

[11] 4,155,101
[45] May 15, 1979

[54] GATING CIRCUIT FOR USE WITH CAMERA INCORPORATING HIGHLIGHT OVERLOAD PROTECTION

[75] Inventor: Barry J. Greatorex, Maldon, England

[73] Assignee: English Electric Valve Company Limited, Chelmsford, England

[21] Appl. No.: 876,364

[22] Filed: Feb. 9, 1978

[30] Foreign Application Priority Data

Mar. 24, 1977 [GB] United Kingdom ............... 12439/77

[51] Int. Cl.² ............................................. H04N 5/34
[52] U.S. Cl. ................................................. 358/223
[58] Field of Search ................ 358/161, 217, 219, 223

[56] References Cited

U.S. PATENT DOCUMENTS

| | | | |
|---|---|---|---|
| 3,764,738 | 10/1973 | Zettl et al. | 178/7.2 N |
| 4,101,932 | 7/1978 | Wiggin | 358/223 |

*Primary Examiner*—Robert L. Griffin
*Assistant Examiner*—Peter Durigon
*Attorney, Agent, or Firm*—Diller, Ramik & Wight

[57] ABSTRACT

A gating circuit intended for use with a camera tube having highlight overload protection is designed to prevent excessively large signals reaching a following video amplifier. These large signals arise when highlight overload protection pulses are applied to the camera tube, and large signals are gated to earth by a pair of diodes arranged to minimize out-of-balance signals.

4 Claims, 1 Drawing Figure

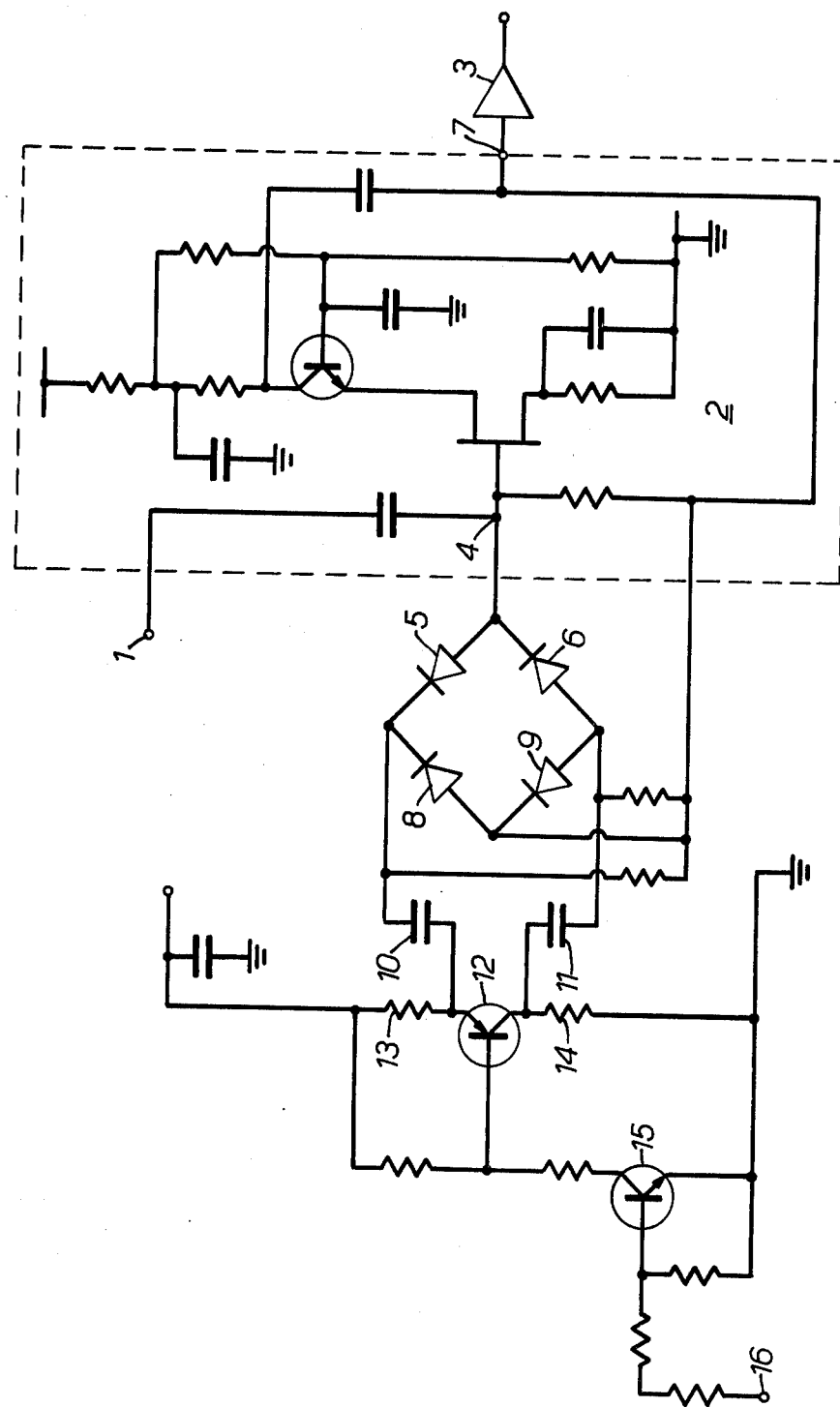

GATING CIRCUIT FOR USE WITH CAMERA INCORPORATING HIGHLIGHT OVERLOAD PROTECTION

This invention relates to a gating circuit for use with or incorporating an amplifier circuit of the kind used to amplify the video signals provided by a television camera tube in which a measure of highlight overload protection is provided. In camera tubes of this kind, highlight overloads caused by excessively bright regions in a viewed scene are removed by discharging the target of the camera tube during the line flyback period by the application of a short pulse. In so doing, signals having relatively high current levels are generated which, in turn, develop excessive signal voltages at the high impedance input terminals of the video amplifier. These excessive voltages have, in the past, required the use of amplifiers having signal ratings well in excess of those needed to handle the normal video signals, and even so the presence of these high voltage levels can cause unacceptable degredation of the video signals if the amplifier does not recover sufficiently quickly from the momentary high voltage signals imposed on it. The present invention seeks to provide a gating circuit which enables this difficulty to be reduced.

According to this invention, a gating circuit for use with a television camera tube is provided with a pair of diodes having matched capacitances and connected together at a point which, in operation, is arranged to receive the video signal from the target of a television camera tube incorporating highlight overload protection, each diode being connected in a low impedance path to earth, and means for simultaneously biassing both diodes into conduction by means of a bias signal, the biassing means and the low impedance paths being so arranged as to minimise the amplitude of the bias signal at the connection point between said pair of diodes.

Preferably, the gating circuit includes a high input impedance amplifier, the input of which is coupled to the connection point between said pair of diodes.

Preferably again, the amplifier includes two stages, the input point of the first stage being coupled to the connection point between said pair of diodes, and a further pair of diodes being connected together at the input point of the second stage of the amplifier, the further pair of diodes also having matched capacitances and being connected in low impedance paths to earth and being arranged to be biassed into conduction at the same time as the first mentioned pair of diodes.

Preferably, both pairs of diodes are capacitively coupled to a common switching transistor by means of which the bias signals are applied to the diodes.

The invention is further described, by way of example, with reference to the accompanying drawing, which illustrates a gating circuit having a two stage amplifier.

The gating circuit is primarily intended for use with a vidicon television camera tube having highlight overload protection. A characteristic of such a tube is tha during the line flyback period a current is obtained over the video signal path which is very much greater than normal video amplitudes. This causes excessive signal voltages to be generated across the high input impedance of the head amplifier. If unchecked, these signals can limit in the head amplifier stages, and due to relatively slow recovery of these circuits, the signal may be spread into the following clamp and picture periods. The use of the gating circuit in accordance with this invention avoids or reduces the need to modify the design of such amplifiers to accommodate the unusually large signal voltages encountered during the highlight overload protection period.

Referring to the drawing, the gating circuit is provided, with a terminal 1 which, in operation, receives the video signal from the target of a vidicon television camera tube (not shown). This terminal is connected to the first stage 2 of a head amplifier having a very high input impedance. The first stage 2 is of conventional design and is indicated by the broken line box and is followed by a second amplifier stage 3, also of conventional design. The input point 4 of the first stage 2 is connected to a pair of diodes 5, 6, and similarly, the input point 7 of the second stage 3 is connected to a further pair of diodes 8, 9. The diodes are poled as shown, and are chosen such that the capacitance of diode 5 is the same as that of diode 6, and so that the capacitance of diode 8 is the same as that of diode 9. The diodes are connected together as shown and are coupled via capacitors 10 and 11 to a switching transistor 12, which is provided with equal low valued emitter and collector resistors 13 and 14. The transistor 12 is driven by a further transistor 15 connected to a terminal 16 at which is applied, a control pulse.

In practice, the four diodes 5, 6, 8 and 9 are located very close to the amplifier stages to minimize stray capacitance effects. In operation, a highlight overload protection pulse of predetermined duration is applied to the auxiliary grid of the vidicon camera tube during each line flyback period. Camera tubes having a highlight overload protection facility are now well known and it is not considered necessary to describe them or their operation in detail. One such tube is currently manufactured by English Electric Valve Company, Limited, the assignee of the instant applicant under the type number P 8136, and for such a tube the aforementioned pulse duration is 6μsec.

This pulse is simultaneously applied to terminal 16, and its effect is to bias into conduction the normally reverse biassed diodes 5, 6, 7, 8. This allows the large currents (typically in excess of 60μA) present at terminal 1 during the highlight overload protection period to discharge to earth via the diodes 5 and 6, capacitors 10 and 11 and transistor 12. The impedance of the two discharge paths must be at least approximately equal to ensure that the control pulse applied to terminal 16 does not appear at point 4. The pulse is phase split at the transistor 12, and the two resulting pulses of opposite and equal polarity bias the diodes 5 and 6 into conduction and cancel out at point 4. In this way, the control pulses do not significantly affect the amplifier stage 2. In case the amplifier stage 2 is slightly affected due to diode or capacitance mismatch, the further diodes 8 and 9 provide a similar function for amplifier stage 3. In order to minimize mismatch, the diodes must be selected for low equal capacitance (typically about 0.7pF) and equal forward voltages.

I claim:

1. A gating circuit for use with a television camera tube including a pair of diodes having matched capacitances and which are connected together at a point which, in operation, is arranged to receive the video signal from the target of a television camera tube incorporating highlight overload protection, each diode being connected in a low impedance path to earth, and means for simultaneously biassing both diodes into conduction by means of a bias signal, the biassing means and the low impedance paths being so arranged as to minimise the amplitude of the bias signal at the connection point between said pair of diodes.

2. A gating circuit as claimed in claim 1 and including a high input impedance amplifier, the input of which is coupled to the connection point between said pair of diodes.

3. A gating circuit as claimed in claim 2 and wherein the amplifier includes two stages, the input point of the first stage being coupled to the connection point between said pair of diodes, and a further pair of diodes being connected together at the input point of the second stage of the amplifier, the further pair of diodes also having matched capacitance and being connected in low impedance paths to earth and being arranged to be biassed into conduction at the same time as the first mentioned pair of diodes.

4. A gating circuit as claimed in claim 3 and wherein both pairs of diodes are capacitively coupled to a common switching transistor by means of which the bias signals are applied to the diodes.

* * * * *